United States Patent
Syed et al.

(10) Patent No.: US 8,907,935 B2
(45) Date of Patent: Dec. 9, 2014

(54) BACKLIGHT CALIBRATION AND CONTROL

(75) Inventors: Taif Ahmed Syed, Toronto (CA); Daniel A. Villamizar, Cupertino, CA (US); David Andrew Doyle, San Francisco, CA (US); Ulrich T. Barnhoefer, Cupertino, CA (US); Venu Madhav Duggineni, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 131 days.

(21) Appl. No.: 13/620,166

(22) Filed: Sep. 14, 2012

(65) Prior Publication Data

US 2013/0328841 A1 Dec. 12, 2013

Related U.S. Application Data

(60) Provisional application No. 61/657,647, filed on Jun. 8, 2012.

(51) Int. Cl.
*G06F 3/038* (2013.01)
*G09G 5/00* (2006.01)

(52) U.S. Cl.
USPC .......................... 345/207; 345/204; 345/690

(58) Field of Classification Search
CPC .......... G09G 5/10; G06F 3/038; H05B 37/02
USPC .................. 315/159; 345/102, 207, 204, 690
See application file for complete search history.

(56) References Cited

U.S. PATENT DOCUMENTS

| 6,271,825 | B1 | 8/2001 | Greene et al. |
| 7,362,322 | B2 | 4/2008 | Kimura et al. |
| 2007/0132398 | A1* | 6/2007 | Ferguson et al. ............. 315/159 |
| 2009/0303216 | A1* | 12/2009 | Shin ............................. 345/207 |
| 2011/0096048 | A1 | 4/2011 | Diefenbaugh et al. |

FOREIGN PATENT DOCUMENTS

WO 2006036693 A3 5/2006

* cited by examiner

*Primary Examiner* — Claire X Pappas
*Assistant Examiner* — Abdul-Samad A Adediran
(74) *Attorney, Agent, or Firm* — Fletcher Yoder PC

(57) ABSTRACT

A system and method for characterizing the power and luminance values for a display. This may include testing a device to determine a luminance value for a display of a given device at a given current and determining whether the first current is to be adjusted during future uses based on a comparison of the luminance with at least one threshold value. This may also include storing an adjusted current value if it is determined that the first current is to be adjusted.

25 Claims, 9 Drawing Sheets

BACKLIGHT CALIBRATION AND CONTROL

CROSS REFERENCE TO RELATED APPLICATIONS

This application is a Non-Provisional Patent Application of U.S. Provisional Patent Application No. 61/657,647, entitled "Backlight Calibration and Control", filed Jun. 8, 2012, which is herein incorporated by reference.

BACKGROUND

The present disclosure relates generally to the operating parameters of an electronic device display.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Visual displays are commonly used for a wide variety of electronic devices, including such consumer electronics as computers and handheld devices (e.g., cellular telephones, audio and video players, gaming systems, and so forth). Such displays typically provide a flat display using display circuitry in a relatively thin package that is suitable for use in a variety of electronic goods.

Often, the number of displays produced may exceed the manufacturing capability of one or more manufacturers. Therefore, it is common for electronic displays to include components from various manufacturers. A problem may arise due to a lack of uniformity of the components manufactured by the different suppliers. In other words, display components from different manufacturers may respond differently to similar signals even under similar conditions. Thus, if the displays do not incorporate techniques for adjusting to the variance in components, a display utilizing components from one manufacturer may appear to display an image in a substantially different manner than a display utilizing components from another manufacturer. Accordingly, there is a need for condition based controls for a display.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Certain embodiments of the present disclosure are directed to production and testing of electronic displays. When large quantities of displays are manufactured, similar display components may have different responses to similar signals under similar conditions. This may arise from manufacturing tolerances or processes differing from one manufacturer to another. For example, display brightness may vary from one device to another. However, variation in the performance of devices may be perceived as a defect by users. Accordingly, the brightness of each manufactured device may be tested and a brightness offset value may be determined for displays that do not conform within general tolerance levels. This offset value may be saved and applied during operation of the device.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain embodiments of the present disclosure are directed to production of electronic displays. When large quantities of displays are manufactured, the demand for components may not be met by one lot of components from a manufacturer or even by one manufacturer. Due to different manufacturing tolerances among manufacturers and varying quality of materials between manufactured lots, similar display components may have different responses to similar signals under similar conditions. For example, display brightness may vary from one device to another. Variation in display brightness may be perceived as a defect in a device. Accordingly, calculation of and application of a brightness offset on a device by device basis may be undertaken to reduce variance in brightness of displays between two electronic devices (i.e., allow for more uniform display characteristics to be achieved). Moreover, this brightness offset may also be utilized as one input for overall calibration of the backlight of the device.

Figure 1:
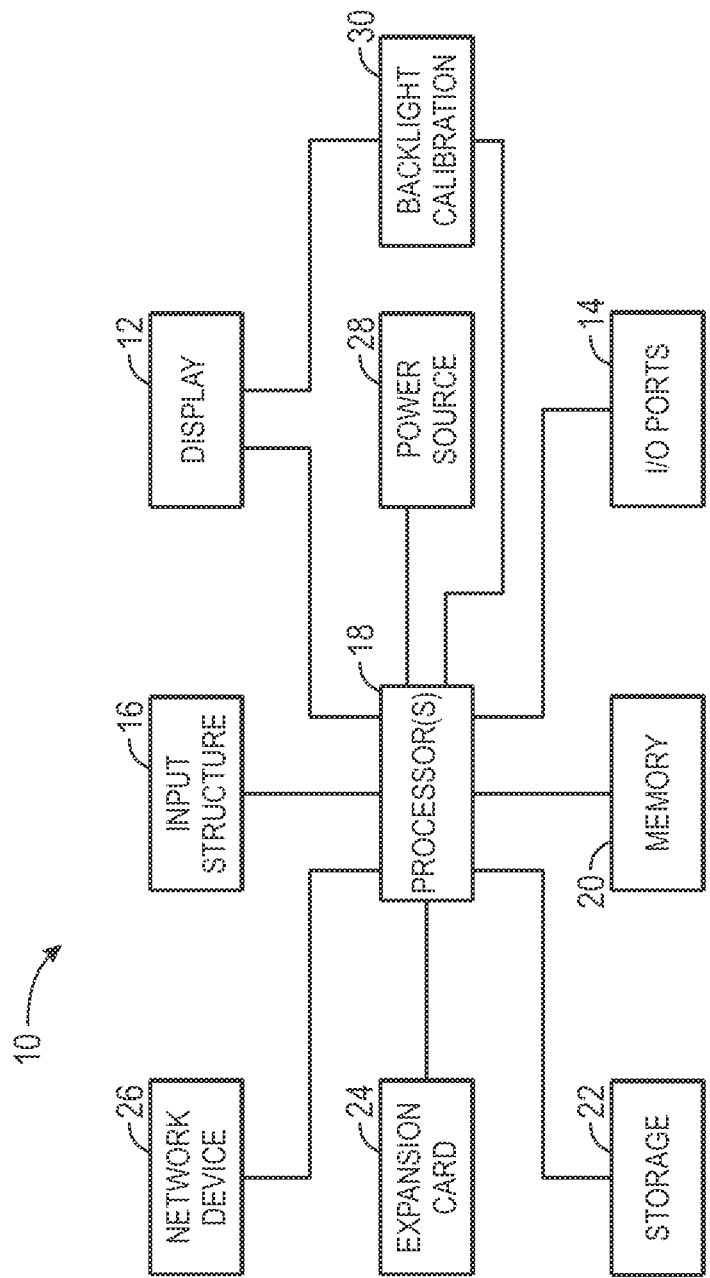
FIG. 1 is a block diagram of an electronic device in accordance with aspects of the present disclosure.

As may be appreciated, electronic devices may include various internal and/or external components which contribute to the function of the device. For instance, FIG. 1 is a block diagram illustrating components that may be present in one such electronic device 10. Those of ordinary skill in the art will appreciate that the various functional blocks shown in FIG. 1 may include hardware elements (including circuitry), software elements (including computer code stored on a computer-readable medium, such as a hard drive or system memory), or a combination of both hardware and software elements. FIG. 1 is only one example of a particular implementation and is merely intended to illustrate the types of components that may be present in the electronic device 10. For example, in the presently illustrated embodiment, these components may include a display 12, input/output (I/O) ports 14, input structures 16, one or more processors 18, one or more memory devices 20, nonvolatile storage 22, expansion card(s) 24, networking device 26, power source 28, and a backlight calibration unit 30.

The display 12 may be used to display various images generated by the electronic device 10. The display 12 may be any suitable display, such as a liquid crystal display (LCD) or an organic light-emitting diode (OLED) display. Additionally, in certain embodiments of the electronic device 10, the display 12 may be provided in conjunction with a touch-sensitive element, such as a touchscreen, that may be used as part of the control interface for the device 10.

The I/O ports 14 may include ports configured to connect to a variety of external devices, such as a power source, headset or headphones, or other electronic devices (such as handheld devices and/or computers, printers, projectors, external displays, modems, docking stations, and so forth). The I/O ports 14 may support any interface type, such as a universal serial bus (USB) port, a video port, a serial connection port, an IEEE-1394 port, a speaker, an Ethernet or modem port, and/or an AC/DC power connection port.

The input structures 16 may include the various devices, circuitry, and pathways by which user input or feedback is provided to processor(s) 18. Such input structures 16 may be configured to control a function of an electronic device 10, applications running on the device 10, and/or any interfaces or devices connected to or used by device 10. For example, input structures 16 may allow a user to navigate a displayed user interface or application interface. Non-limiting examples of input structures 16 include buttons, sliders, switches, control pads, keys, knobs, scroll wheels, keyboards, mice, touchpads, microphones, and so forth. Additionally, in certain embodiments, one or more input structures 16 may be provided together with display 12, such an in the case of a touchscreen, in which a touch sensitive mechanism is provided in conjunction with display 12.

Processors 18 may provide the processing capability to execute the operating system, programs, user and application interfaces, and any other functions of the electronic device 10. The processors 18 may include one or more microprocessors, such as one or more "general-purpose" microprocessors, one or more special-purpose microprocessors or ASICS, or some combination of such processing components. For example, the processors 18 may include one or more reduced instruction set (RISC) processors, as well as graphics processors, video processors, audio processors, and the like. As will be appreciated, the processors 18 may be communicatively coupled to one or more data buses or chipsets for transferring data and instructions between various components of the electronic device 10.

Programs or instructions executed by processor(s) 18 may be stored in any suitable manufacture that includes one or more tangible, computer-readable media at least collectively storing the executed instructions or routines, such as, but not limited to, the memory devices and storage devices described below. Also, these programs (e.g., an operating system) encoded on such a computer program product may also include instructions that may be executed by the processors 18 to enable device 10 to provide various functionalities, including those described herein.

The instructions or data to be processed by the one or more processors 18 may be stored in a computer-readable medium, such as a memory 20. The memory 20 may include a volatile memory, such as random access memory (RAM), and/or a non-volatile memory, such as read-only memory (ROM). The memory 20 may store a variety of information and may be used for various purposes. For example, the memory 20 may store firmware for electronic device 10 (such as basic input/output system (BIOS)), an operating system, and various other programs, applications, or routines that may be executed on electronic device 10. In addition, the memory 20 may be used for buffering or caching during operation of the electronic device 10.

The components of the device 10 may further include other forms of computer-readable media, such as non-volatile storage 22 for persistent storage of data and/or instructions. Non-volatile storage 22 may include, for example, flash memory, a hard drive, or any other optical, magnetic, and/or solid-state storage media. Non-volatile storage 22 may be used to store firmware, data files, software programs, wireless connection information, and any other suitable data.

The embodiment illustrated in FIG. 1 may also include one or more card or expansion slots. The card slots may be configured to receive one or more expansion cards 24 that may be used to add functionality, such as additional memory, I/O functionality, or networking capability, to electronic device 10. Such expansion cards 24 may connect to device 10 through any type of suitable connector, and may be accessed internally or external to the housing of electronic device 10. For example, in one embodiment, expansion cards 24 may include a flash memory card, such as a SecureDigital (SD) card, mini- or microSD, CompactFlash card, Multimedia card (MMC), or the like. Additionally, expansion cards 24 may include one or more processor(s) 18 of the device 10, such as a video graphics card having a GPU for facilitating graphical rendering by device 10.

The components depicted in FIG. 1 also include a network device 26, such as a network controller or a network interface card (MC). In one embodiment, the network device 26 may be a wireless NIC providing wireless connectivity over any 802.11 standard or any other suitable wireless networking standard. The device 10 may also include a power source 28. In one embodiment, the power source 28 may include one or more batteries, such as a lithium-ion polymer battery or other type of suitable battery. Additionally, the power source 28 may include AC power, such as provided by an electrical outlet, and electronic device 10 may be connected to the power source 28 via a power adapter. This power adapter may also be used to recharge one or more batteries of device 10.

The electronic device 10 may also include a backlight calibration unit 30. In one embodiment, the backlight calibration unit 30 may be used to determine and/or apply an offset value to the display to alter the current applied to LED strings in the display. As will be discussed in greater detail below, this offset value may allow for the electronic device 10 to display images at a particular brightness.

The electronic device 10 may take the form of a computer system or some other type of electronic device. Such computers may include computers that are generally portable (such as laptop, notebook, tablet, and handheld computers), as well as computers that are generally used in one place (such as conventional desktop computers, workstations and/or servers). In certain embodiments, electronic device 10 in the form of a computer may include a model of a MacBook®, MacBook® Pro, MacBook Air®, iMac®, Mac® mini, or Mac® Pro available from Apple Inc. of Cupertino, Calif.

Figure 2:
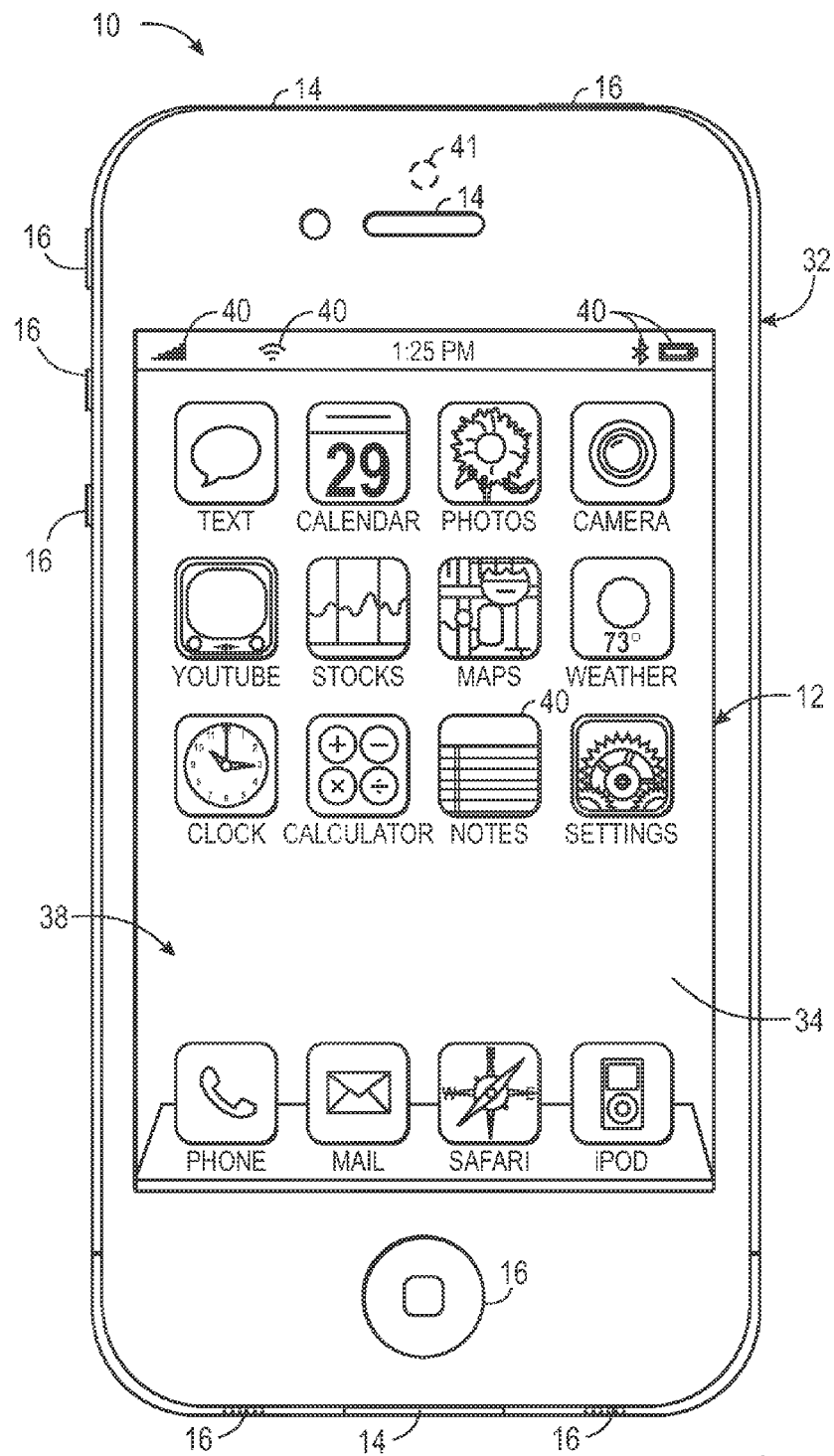
FIG. 2 is a perspective view of a cellular device in accordance with aspects of the present disclosure.
Figure 3:
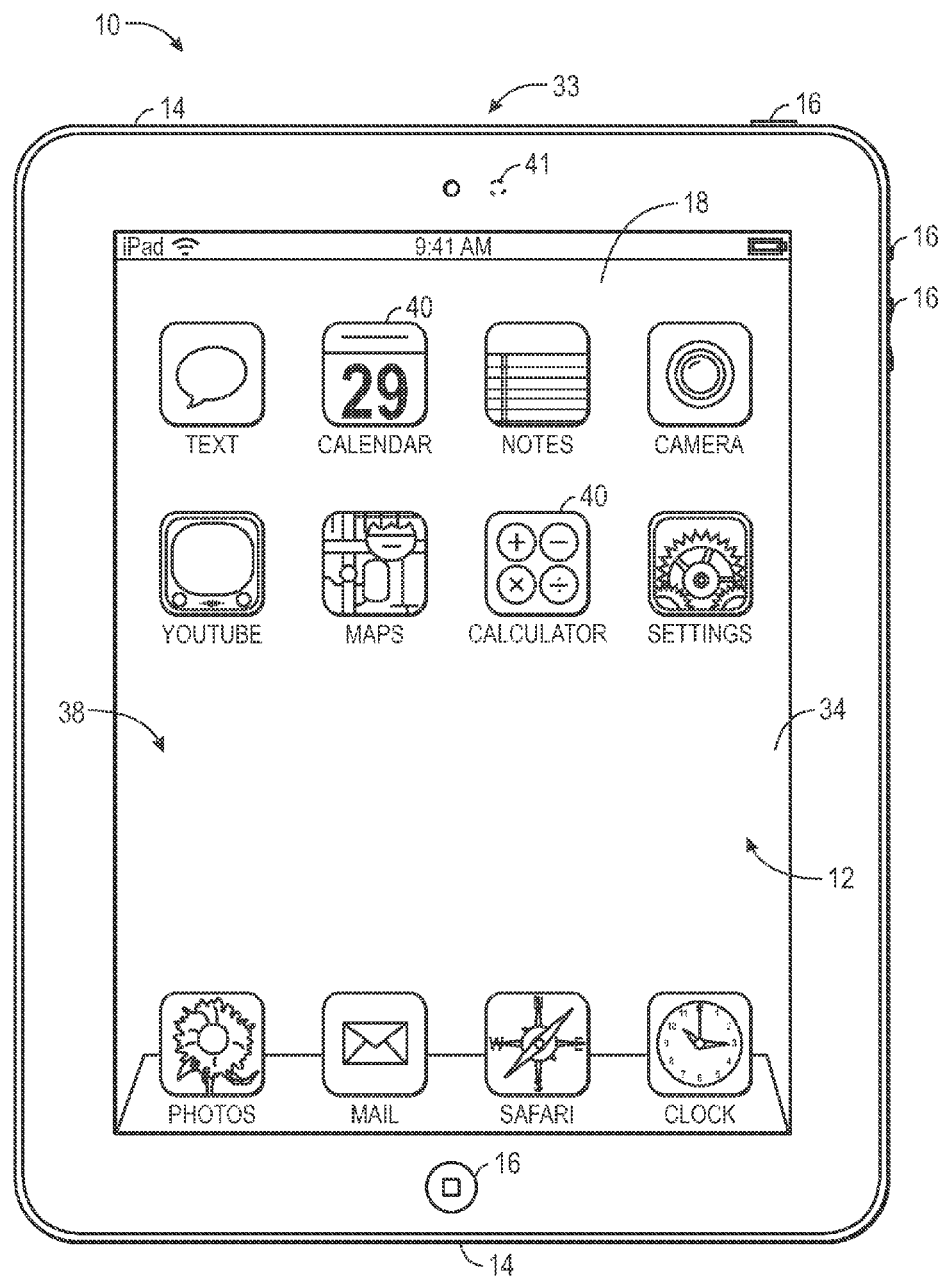
FIG. 3 is a perspective view of a handheld electronic device in accordance with aspects of the present disclosure.

The electronic device 10 may also take the form of other types of electronic devices. In some embodiments, various electronic devices 10 may include mobile telephones, media players, personal data organizers, handheld game platforms, cameras, and combinations of such devices. For instance, as generally depicted in FIG. 2, the device 10 may be provided in the form of a cellular device 32 (such as a model of an iPhone®), that includes various functionalities (such as the ability to take pictures, make telephone calls, access the Internet, communicate via email, record audio and video, listen to music, play games, and connect to wireless networks). Alternatively, as depicted in FIG. 3, the electronic device 10 may be provided in the form of a handheld electronic device 33. By way of further example, handheld device 33 may be a model of an iPod® or iPad® available from Apple Inc. of Cupertino, Calif.

Electronic device 10 of the presently illustrated embodiment includes a display 12, which may be in the form of an LCD 34. The LCD 34 may display various images generated by electronic device 10, such as a graphical user interface (GUI) 38 having one or more icons 40. The device 36 may also include various I/O ports 14 to facilitate interaction with other devices, and user input structures 16 to facilitate interaction with a user, as well as an ambient light sensor 41 that includes one or more photosensors or photodetectors that sense light or other electromagnetic energy, such as ambient light surrounding the electronic device 10.

Figure 4:
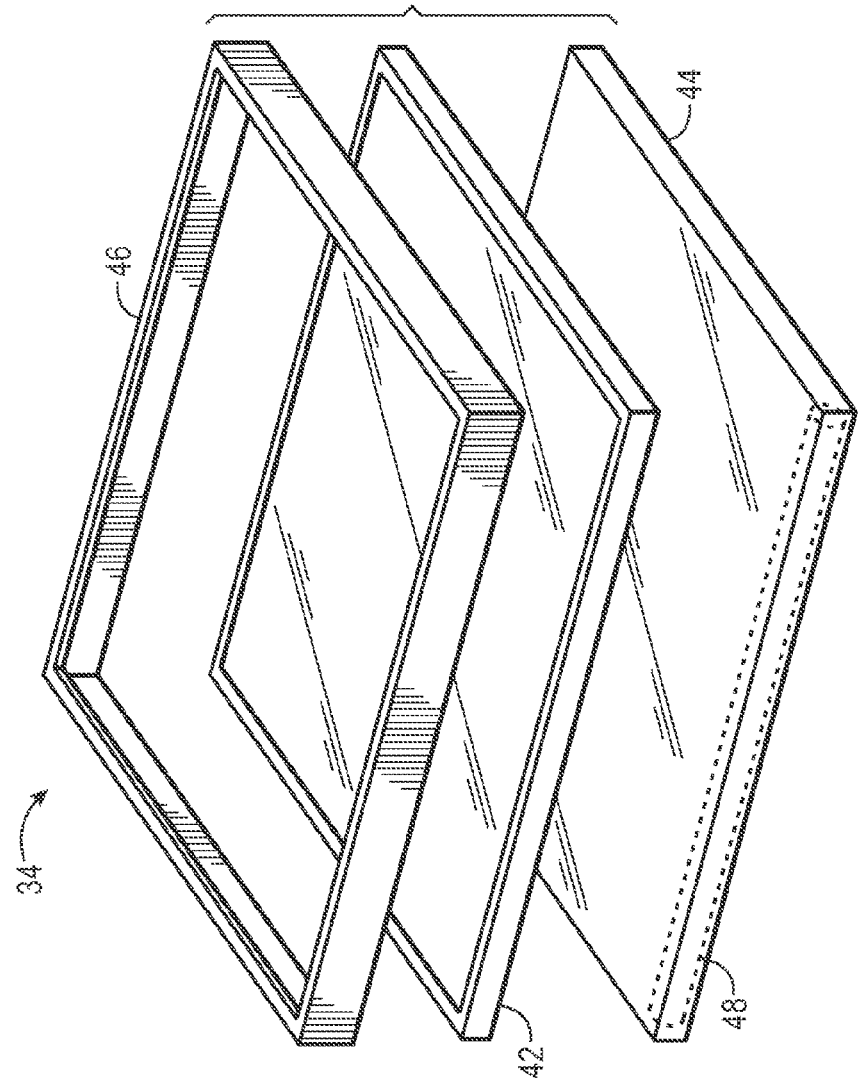
FIG. 4 is an exploded view of a liquid crystal display (LCD) in accordance with aspects of the present disclosure.

One example of an LCD display 34 of the electronic device 10 is depicted in FIG. 4 in accordance with one embodiment. The depicted LCD display 34 includes an LCD panel 42 and a backlight unit 44, which may be assembled within a frame 46. As may be appreciated, the LCD panel 42 may include an array of pixels configured to selectively modulate the amount and color of light passing from the backlight unit 44 through the LCD panel 42. For example, the LCD panel 42 may include a liquid crystal layer, one or more thin film transistor (TFT) layers configured to control orientation of liquid crystals of the liquid crystal layer via an electric field, and polarizing films, which cooperate to enable the LCD panel 42 to control the amount of light emitted by each pixel. Additionally, the LCD panel 42 may include color filters that allow specific colors of light to be emitted from the pixels (e.g., red, green, and blue).

The backlight unit 44 includes one or more light sources 48. Light from the light source 48 is routed through portions of the backlight unit 44 (e.g., a light guide and optical films) and generally emitted toward the LCD panel 42. In various embodiments, light source 48 may include a cold-cathode fluorescent lamp (CCFL), one or more light emitting diodes (LEDs), or any other suitable source(s) of light. Further, although the LCD 34 is generally depicted as having an edge-lit backlight unit 44, it is noted that other arrangements may be used (e.g., direct backlighting) in full accordance with the present technique.

Figure 5:
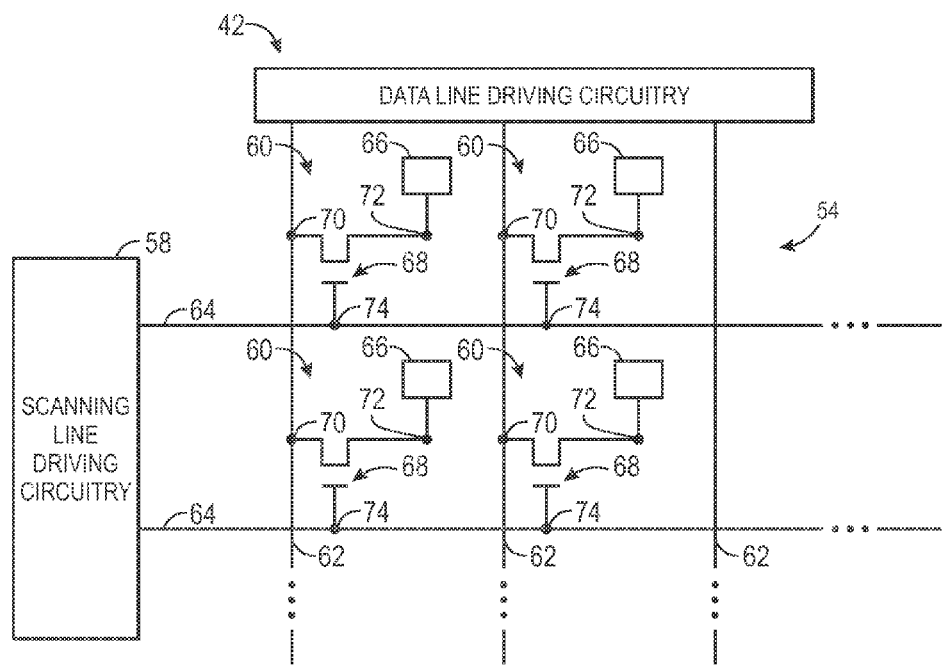
FIG. 5 graphically depicts circuitry that may be found in the LCD of FIG. 4 in accordance with aspects of the present disclosure.

Referring now to FIG. 5, an example of a circuit view of pixel-driving circuitry found in an LCD 34 is provided. For example, the circuitry depicted in FIG. 5 may be embodied on the LCD panel 42 described above with respect to FIG. 4. The pixel-driving circuitry includes an array or matrix 54 of unit pixels 60 that are driven by data (or source) line driving circuitry 56 and scanning (or gate) line driving circuitry 58. As depicted, the matrix 54 of unit pixels 60 forms an image display region of the LCD 34. In such a matrix, each unit pixel 60 may be defined by the intersection of data lines 62 and scanning lines 64, which may also be referred to as source lines 62 and gate (or video scan) lines 64. The data line driving circuitry 56 may include one or more driver integrated circuits (also referred to as column drivers) for driving the data lines 62. The scanning line driving circuitry 58 may also include one or more driver integrated circuits (also referred to as row drivers).

Each unit pixel 60 includes a pixel electrode 66 and thin film transistor (TFT) 68 for switching the pixel electrode 66. In the depicted embodiment, the source 70 of each TFT 68 is electrically connected to a data line 62 extending from respective data line driving circuitry 56, and the drain 72 is electrically connected to the pixel electrode 66. Similarly, in the depicted embodiment, the gate 74 of each TFT 68 is electrically connected to a scanning line 64 extending from respective scanning line driving circuitry 58.

In one embodiment, column drivers of the data line driving circuitry 56 send image signals to the pixels via the respective data lines 62. Such image signals may be applied by line-sequence, i.e., the data lines 62 may be sequentially activated during operation. The scanning lines 64 may apply scanning signals from the scanning line driving circuitry 58 to the gate 74 of each TFT 68. Such scanning signals may be applied by line-sequence with a predetermined timing or in a pulsed manner.

Each TFT 68 serves as a switching element which may be activated and deactivated (i.e., turned on and off) for a predetermined period based on the respective presence or absence of a scanning signal at its gate 74. When activated, a TFT 68 may store the image signals received via a respective data line 62 as a charge in the pixel electrode 66 with a predetermined timing.

The image signals stored at the pixel electrode 66 may be used to generate an electrical field between the respective pixel electrode 66 and a common electrode. Such an electrical field may align liquid crystals within a liquid crystal layer to modulate light transmission through the LCD panel 42. Unit pixels 60 may operate in conjunction with various color filters, such as red, green, and blue filters. In such embodiments, a "pixel" of the display may actually include multiple unit pixels, such as a red unit pixel, a green unit pixel, and a blue unit pixel, each of which may be modulated to increase or decrease the amount of light emitted to enable the display to render numerous colors via additive mixing of the colors.

In some embodiments, a storage capacitor may also be provided in parallel to the liquid crystal capacitor formed between the pixel electrode 66 and the common electrode to prevent leakage of the stored image signal at the pixel electrode 66. For example, such a storage capacitor may be provided between the drain 72 of the respective TFT 68 and a separate capacitor line.

Figure 6:
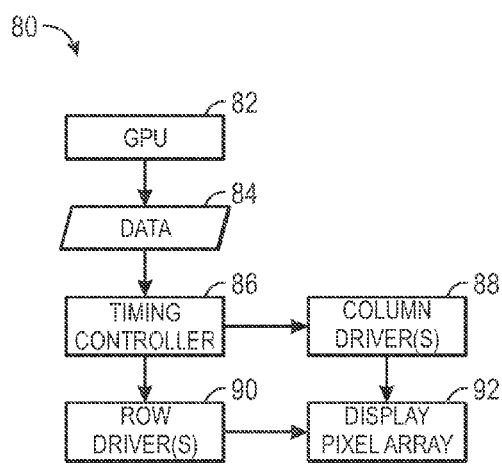
FIG. 6 is a block diagram representative of how the LCD of FIG. 4 receives data and drives a pixel array of the LCD in accordance with aspects of the present disclosure.

Certain components for processing image data and rendering images on an LCD 34 based on such data are depicted in block diagram 80 of FIG. 6 in accordance with an embodiment. In the illustrated embodiment, a graphics processing unit (GPU) in block 82, or some other processor 18, transmits data in block 84 to a timing controller in block 86 of the LCD 34. The data generally includes image data that may be processed by circuitry of the LCD 34 to drive the unit pixels 60 of, and render an image on, the LCD 34. The timing controller, in block 86, may then send signals to, and control operation of, one or more column drivers (or other data line driving circuitry 56) in block 88 and one or more row drivers in block 90 (or other scanning line driving circuitry 58). These column drivers and row drivers may generate analog signals for driving the various unit pixels 60 of a pixel array of the LCD 34 in block 92 to generate images on the LCD 34.

Figure 7:
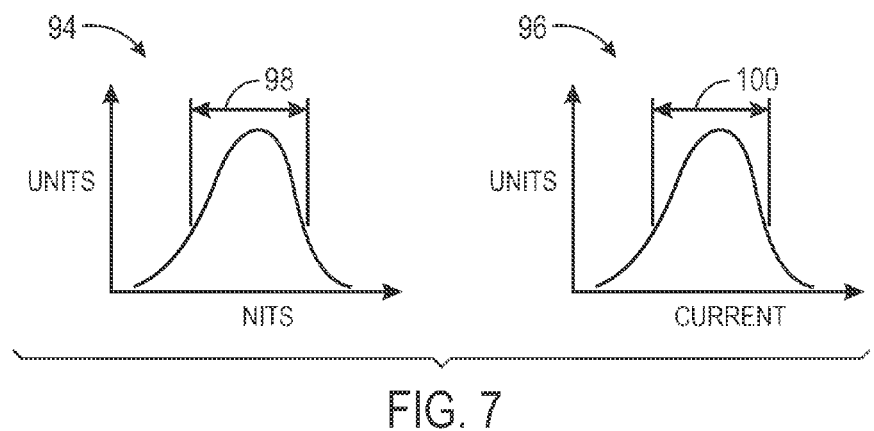
FIG. 7 includes graphical representations of brightness and current outputs for a set of devices of FIG. 1 in accordance with aspects of the present disclosure.

However, as previously noted, these images on the LCD 34 may not be of a uniform brightness across various devices 10. FIG. 7 illustrates a first graph 94 and a second graph 96 illustrating variations in electronic devices 10 made, for example, by various manufacturers or in various batches. Graph 94 illustrates that for a given current applied to the LCD 34, the brightness as measured in nits, may be distributed (e.g., as a Gaussian distribution or another distribution) for a given set of units. That is, the brightness for a set of units (i.e., devices 10) may vary across the distribution of graph 94 such that the majority of units may fall within a particular range 98, however, the units that fall outside this range 98 may be perceived as having quality issues regarding brightness of their LCDs 34.

Graph 96 of FIG. 7 illustrates the results of adjusting each electronic device 10 from various manufacturers or in various batches to display an image at a common brightness. That is, instead of driving the LCDs 34 of the devices 10 at a common current, the devices 10 may be driven to a common brightness, thus alleviating the appearance of quality issues regarding brightness of the devices 10. However, as illustrated in graph 96, driving the devices 10 to a common brightness may generate a distribution in the amount of power consumed by the devices (e.g., a Gaussian distribution or another distribution). That is, the consumption of power for a set of units (i.e., devices 10) based on current applied to the LCD 34 may vary across the distribution of graph 96 such that the majority of units may fall within a particular range 100, however, the units that fall outside this range 100 may be perceived as having quality issues regarding power consumption (i.e., battery life) for the devices 10.

Figure 8:
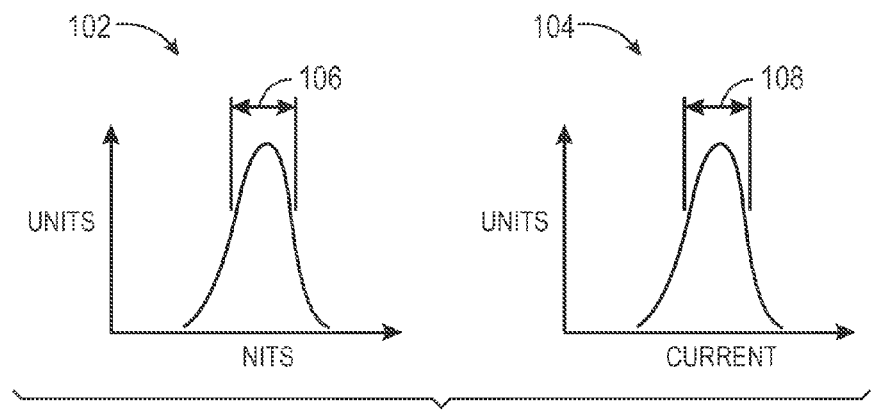
FIG. 8 includes second graphical representations of brightness and current outputs for a set of devices of FIG. 1 in accordance with aspects of the present disclosure.

To reduce the number of devices that fall outside ranges 98 and 100, calibration of the individual devices 10 may be performed. This calibration of the devices 10 may generate graphs 102 and 104, as illustrated in FIG. 8. Graph 102 is similar to graph 94 in that graph 102 illustrates that for a given current applied to the LCD 34, the brightness as measured in nits, may be distributed for a given set of units. That is, the brightness for a set of units may vary across the distribution of graph 102 such that the majority of units may fall within a particular range 106. However, it should be noted that this range 106 is smaller than range 92 and that the total width of the distribution of graph 102 is smaller than the distribution illustrated in graph 94. Thus, fewer units (i.e., devices 10) may be perceived as having quality issues regarding brightness of their respective LCDs 34.

Graph 104 of FIG. 8 is similar to graph 96 in that graph 104 illustrates the results of adjusting each electronic device 10 from various manufacturers or in various batches to display an image around a common brightness value. That is, instead of driving the LCDs 34 of the devices 10 at a common current, the devices 10 may be driven to a common brightness. Furthermore, by applying calibrating the devices, the range of currents applied may fall into range 108. Moreover, this range 108 is smaller than range 100, and that the total width of the distribution of graph 104 is smaller than the distribution illustrated in graph 96. Thus, fewer units (i.e., devices 10) may be perceived as having quality issues regarding power consumption due to powering their respective LCDs 34.

Figure 9:
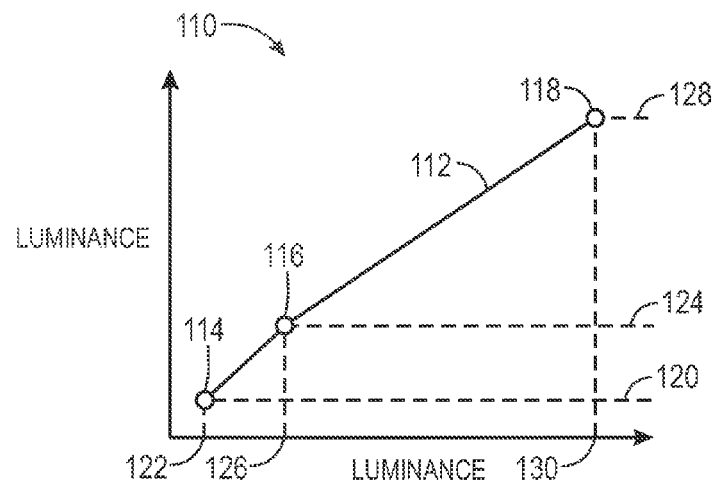
FIG. 9 includes a graphical representations of a luminance curve for an LCD of FIG. 2 or 3 in accordance with aspects of the present disclosure.

Graph 110 of FIG. 9 illustrates the results of the calibration of each device 10, as will be discussed in greater detail below. Graph 110 represents, for example, the luminance curve 112 of a given LCD 34 for a particular device 10. This luminance curve may be generated based upon, for example, point 114, point 116, and point 116. Point 114 may correspond to the current necessary to generate a first user perceived brightness 120 of the LCD 34 when tested at a first condition (for example, a user icon 40, such as a slider that may allow for user control of the brightness of the display 34, is set to its lowest level), which is accomplished at a true brightness 122 (e.g., luminance) of the display 12. Similarly, point 116 may correspond to the current necessary to generate a second user perceived brightness 124 of the LCD 34 when tested at a second condition (for example, a user icon 40, such as a slider that may allow for user control of the brightness of the display 34, is set to a midpoint level), which is accomplished at a true brightness 126 (e.g., luminance) of the display 12. Finally, point 118 may correspond to the maximum brightness 128 of the LCD 34, accomplished at a determined maximum current at a third condition (for example, a user icon 40, such as a slider that may allow for user control of the brightness of the display 34, is set to a highest level), which is accomplished at a true brightness 130 (e.g., luminance) of the display. In some embodiments, the brightness levels 120, 122, 124, 126, 128, and 130 of the LCD 34 and/or the currents to drive them may be preset as finite values. In other embodiments, the brightness levels 120, 122, 124, 126, 128, and 130 of the LCD 34 and/or the currents to drive them may experimentally determined Based on points 114, 116, and 118, the luminance curve 112, as well as the calibration values for the LCD 34 to generate that curve 112 may be determined for a given device 10.

Figure 10:
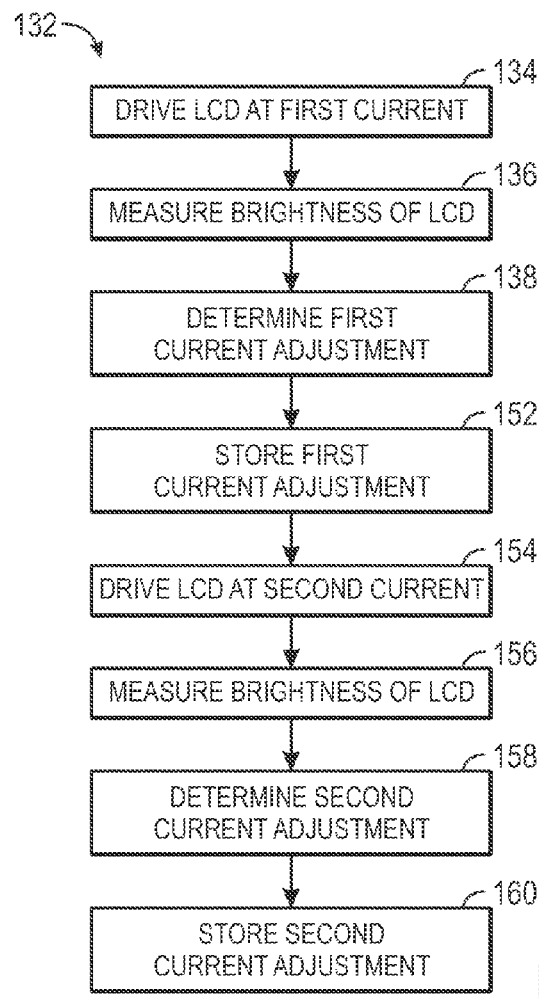
FIG. 10 includes a flow chart illustrating a method of generating the luminance curve of FIG. 9 in accordance with aspects of the present disclosure.

The flow chart 132 of FIG. 10 illustrates a technique for determining the calibration values for a device 10. In step 134, the LCD 34 of the device 10 may be driven at a first current, for example, 10 mA, 11 mA, 12 mA, 13 mA, 14 mA, 15 mA, 16 mA, 17 mA, 18 mA, 19 mA, 20 mA, 21 mA, 22 mA, 23 mA, 24 mA, 25 mA, or another value. The brightness of the LCD 34 may then be measured in step 136. The brightness may be externally determined by a tester and physically input into the device 10 as part of the testing process or the brightness may be determined internally by the device 10, for example, the through the use of the ambient light sensor 41, which may be adjusted to measure the light transmitted to the LCD 34. In step 138, a first current adjustment may be determined. This first current adjustment may represent, for example, a calibration used to calibrate a backlight unit 44 of the LCD 34. This determination step 138 may be determined as described below with respect to FIG. 11.

Figure 11:
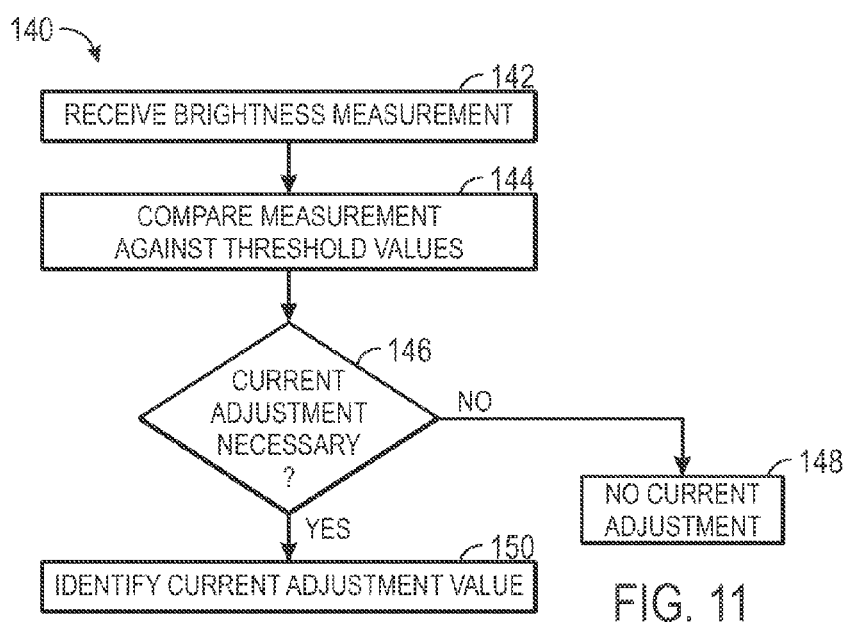
FIG. 11 includes a flow chart illustrating a method of determining a calibration value for the device of claim 1 in accordance with aspects of the present disclosure.

FIG. 11 illustrates a flow chart 140 that may outline the process for determining the first current adjustment in step 138 of FIG. 10. In step 142, the brightness measurement is received, for example, from user input or the ambient light sensor 41. In step 144, this brightness measurement may then be compared to low and high threshold values, such as a minimum operating brightness threshold and a maximum operating brightness threshold corresponding to the brightness 128 of the LCD 34 when operating at the third condition (for example, brightness of the LCD 34 when a GUI slider icon 40 is located at a maximum value of a displayed range).

In one embodiment, the low threshold value may be a brightness of, for example, 350 nits, 400 nits, 450 nits, 500 nits, 550 nits, or another value, while the high threshold value may be a brightness of, for example, 550 nits, 600 nits, 650 nits, 700 nits, 750 nits, or another value. In step 146, if the brightness measurement falls between the low threshold and the high threshold, no adjustment to the current driving the LCD 34 is deemed necessary in step 148 (i.e., no calibration value is utilized). If, however, the brightness measurement falls below the low threshold, a current adjustment value is identified in step 150. This current adjustment value may be determined, for example, as an adjustment to the maximum current used to provide the brightness 124 by the equation:

$$I_{max} = \min\left[\left\{1 + \left(\frac{\text{low threshold} - \text{measured brightness}}{\text{measured brightness}}\right)\right\} \cdot \text{test current}, \text{max current}\right]$$

That is, the current adjustment is set as the lesser of a preset maximum current for brightness 128 of the device 10 and a function of the measured brightness at the tested current against the low threshold. If, the brightness measurement is above the high threshold, a current adjustment value is identified in step 150. This current adjustment value may be determined, for example, as an adjustment to the maximum current used to provide the brightness 128 by the equation:

$$I_{max} = \max\left[\left\{1 + \left(\frac{\text{high threshold} - \text{measured brightness}}{\text{measured brightness}}\right)\right\} \cdot \text{test current}, \text{min current}\right]$$

That is, the current adjustment is set as the greater of a preset minimum current for the device 10 for operational brightness 128 of the device 10 and a function of the measured brightness at the tested current against the high threshold.

Returning to FIG. 10, the first current adjustment (determined as described in FIG. 11) is stored for use by the device 10 in step 152. A second determination may then begin for determining a second calibration value for the device 10. In step 154, the LCD 34 of the device 10 may be driven at a second current, for example, 2 mA, 2.5 mA, 3 mA, 3.5 mA, 4 mA, 4.5 mA 5 mA, 5.5 mA, 6 mA, 6.5 mA, 7 mA, or another value. The brightness of the LCD 34 may then be measured in step 156. Again, the brightness may be externally determined by a tester and physically input into the device 10 as part of the testing process or the brightness may be determined internally by the device 10, for example, the through the use of the ambient light sensor 41, which may be adjusted to measure the light transmitted to the LCD 34. In step 158, a second current adjustment may be determined. This second current adjustment may represent, for example, a second calibration used to calibrate a backlight unit 44 of the LCD 34. This determination step 158 may be also determined as described below with respect to FIG. 11.

FIG. 11 illustrates a flow chart 140 that may outline the process for determining the second current adjustment in step 158 of FIG. 10. In step 142, the brightness measurement is received, for example, from user input or the ambient light sensor 41. In step 144, this brightness measurement may then be compared to low and high threshold values, such as a minimum brightness threshold and a maximum brightness threshold corresponding to the brightness 124 of the LCD 34 when operating at a second condition (for example, brightness of the LCD 34 when a GUI slider icon 40 is located at a midpoint value of a displayed range). In one embodiment, the low threshold value may be a brightness of, for example, 100 nits, 120 nits, 140 nits, 160 nits, or another value, while the high threshold value may be a brightness of, for example, 140 nits, 160 nits, 180 nits, 200 nits, or another value. In step 146, if the brightness measurement falls between the low threshold and the high threshold, no adjustment to the current driving the LCD 34 is deemed necessary in step 148 (i.e., no calibration value is utilized). If, however, the brightness measurement falls below the low threshold, a current adjustment value is identified in step 150. This current adjustment value may be determined, for example, as an adjustment to the middle current used to provide the brightness 124 by the equation:

$$I_{mid} = \min\left[\left\{1 + \left(\frac{\text{low threshold} - \text{measured brightness}}{\text{measured brightness}}\right)\right\} \cdot \text{test current}, \text{max current}\right]$$

That is, the current adjustment is set as the lesser of a preset maximum current for brightness 124 of the device 10 (which may be lower than the preset maximum current for brightness 128 discussed above) and a function of the measured brightness at the tested current against the low threshold. If, the brightness measurement is above the high threshold, a current adjustment value is identified in step 150. This current adjustment value may be determined, for example, as an adjustment to the middle current used to provide the brightness 124 by the equation:

$$I_{mid} = \max\left[\left\{1 + \left(\frac{\text{high threshold} - \text{measured brightness}}{\text{measured brightness}}\right)\right\} \cdot \text{test current}, \text{min current}\right]$$

That is, the current adjustment is set as the greater of a preset minimum current for the device 10 for brightness 124 of the device 10 and a function of the measured brightness at the tested current against the high threshold. Returning to FIG. 10, the second current adjustment (determined as described in FIG. 11) is stored for use by the device 10 in step 152. Thus, each device 10 may have adjustment factors stored therein such that during operation of the device 10 (i.e., during rest periods or active periods) the current transmitted to the LCD 34 of the device 10 may be adjusted based on specific physical characteristic of that device 10 (i.e., if the LCD 34 would appear dimmer to a user when in use relative to other devices 10, more current may be utilized to drive the LCD 34, while if the LCD 34 would appear brighter to a user when in use relative to other devices 10, less current may be utilized to drive the LCD 34).

It should be noted that the processes discussed in FIGS. 10 and 11 may be performed by hardware, software (i.e., code or instructions stored on a tangible machine readable medium such as memory 20 or storage 22 and executed by, for example, processor 18), or some combination thereof. Additionally or alternatively, a processor and memory and/or storage may be utilized in the backlight calibration unit 30 to perform the steps recited in FIGS. 10 and 11.

The determination of calibration values stored in steps 152 and 160 discussed above may be performed by a manufacturer and/or by a user. Additionally, the determination of these brightness calibration values may allow for dynamically generated calibration values based on an individual device 10, thus reducing the overall memory footprint of the device (since only particular adjustment values are stored for a device 10). Moreover, as these values may be determined on a device by device basis, the technique may be scalable and applicable across product lines (i.e. with mp3 players, phones, and tablet devices), since the techniques are not panel or product dependent. The techniques may also allow for less power consumption variation and brightness variation across devices 10, and, thus, may allow for greater customer satisfaction and less quality complaints deriving from non-standard operation of similar devices 10.

Figure 12:
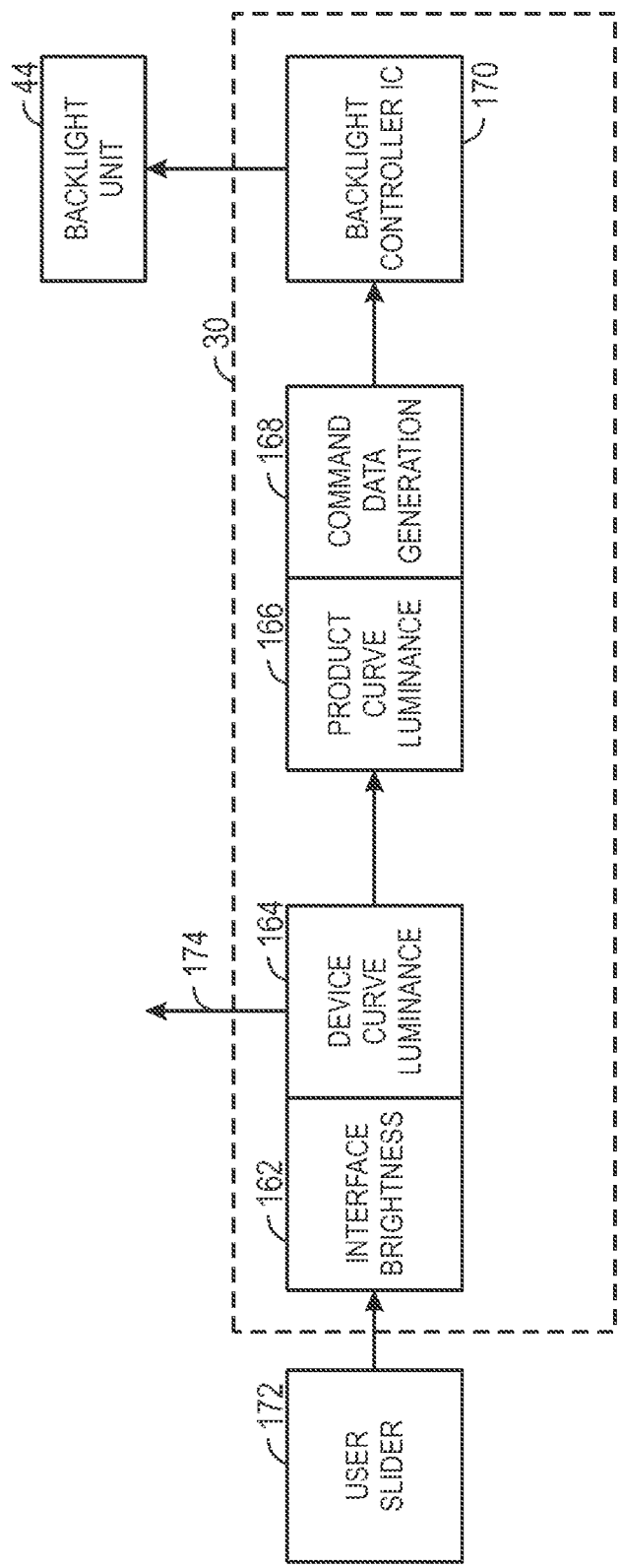
FIG. 12 illustrates a block diagram illustrating the interaction between the display calibration unit of FIG. 1 and the backlight unit of FIG. 4 in accordance with aspects of the present disclosure.

The stored calibration values may be utilized by the device 10 during operation. FIG. 12 illustrates a block diagram of the backlight calibration unit 30 interacting with the backlight unit 44. Backlight calibration unit 30, as illustrated, may utilize information from the interface brightness block 162, the device luminance curve block 164, the product luminance curve block 166, and the command generation block 168 to generate information that may be utilized by the backlight controller integrated circuit (IC) 170 to drive the backlight unit 44. In one embodiment, the processes discussed below with respect to FIGS. 12 and 13 may be performed by hardware, software (i.e., code or instructions stored on a tangible machine readable medium such as memory 20 or storage 22 and executed by, for example, processor 18), or some combination thereof. Additionally or alternatively, the processor executing the instructions may be the backlight controller IC 170 operating in conjunction with memory and/or storage located in the backlight calibration unit 30. Finally, it is envisioned that each of the interface brightness block 162, the device luminance curve block 164, the product luminance curve block 166, and the command generation block 168 may comprise values stored in memory that may be located in memory 20 or storage 22, located in memory internal to the backlight calibration unit 30, may be internal to the backlight controller integrated circuit (IC) 170, or some combination thereof.

The interface brightness block 162, may include a curve or set of values indicative of predetermined response characteristics of the device 10 in response to an input. For example, the interface brightness block 162 may include a values or a curve representing preset values that corresponds to the desired response of the device in relation to a user interfacing with a GUI 38 of the device, for example, sliding a brightness icon 40 along the LCD 34 to allow for user specified brightness levels to be emitted from the device 10. Thus, the interface brightness block 162 may receive inputs from the user slider 172 (e.g., signals transmitted to the interface brightness block 162 that relate the input of a user relating to a brightness slider or other GUI to the interface brightness block 162) and may provide a location along the a curve or provide a value from a set of values indicative of the luminance of the device associated with the inputs received. This information may then be utilized by the device luminance curve block 164.

Thus, information from this interface brightness block 162 may be utilized in conjunction with information stored in the device luminance curve block 164. The information in the device luminance curve block 164 may correspond to the luminance curve 112 of a given LCD 34 for a particular device 10, as previously discussed with respect to FIG. 9. That is, the information in the device luminance curve block 164 may correspond to the calibration values stored in steps 152 and 160 of FIG. 11. In one embodiment, these values may be transmitted along path 174 to other portions of the device 10 as needed.

Moreover, based on the interface of a user, device specific luminance characteristics may be determined based on the information stored in the device luminance curve block 164. That is, information related to both true luminance being provided by the backlight unit 44 and information related to the perceived luminance being received by a user (e.g., user experience luminance) for a given slider location as part of a GUI 38 may be determined based on selecting a location along the curve 112 or by selecting a value from a set of values indicative of the luminance experienced by a user corresponding to a position of the slider (e.g., corresponding to the information received from the interface brightness block 162). This user experienced luminance value and/or the actual luminance based on, for example, the slider icon 40 position, may be provided to the product luminance curve block 166. Additionally, this user experienced luminance value and/or the actual luminance based on, for example, the slider icon 40 position, may also be provided to other portions of the device 10.

The product luminance curve block 166 may be a characteristic curve or set of values relating to the observed operation of a predetermined number of devices 10 of the same product as the device 10 in which the backlight calibration unit 30 resides. In one embodiment, the product luminance curve block 166 is populated with information relating to the average behavior of a product. This information may be determined by, for example, measuring device response characteristics for a set of devices 10 (i.e., 10, 20, 30, 40, 50, or more devices). For example, brightness of the set of devices 10 with respect to a plurality of LCD 34 currents may be measured, averaged, and linearized into the information contained in the product luminance curve block 166. This information may include, for example, 100, 200, 300, 400, 500, 600, or more data points and a curve based on these data points may be extrapolated. In another embodiment, a polynomial related to the data points may be stored in the product luminance curve block 156. In some embodiments, adjustment of the populated with information relating to the average behavior of a product may be aided by information the product luminance curve block 166 is populated with information relating to the average behavior of a product.

This product luminance curve block 166 may receive an indication of luminance that was determined in the device luminance curve block 164. Based on this value (e.g., which may include adjustments for inherent characteristics of the device 10 as previously described in conjunction with FIGS. 10 and 11), the product luminance curve block 166 may determine the relevant current to drive the device by determining a location along the a curve that corresponds to the indication of luminance indicated by the device luminance curve block 164 or the luminance curve block 166 may determine the relevant current to drive the device by selecting a value from a set of values indicative of the indication of luminance from the device luminance curve block 164. That is, the product luminance curve block 166 operates to receive a specific luminance value of the backlight and look-up and output the corresponding current related to that luminance.

The command generation block 168 may receive an indication of the current determined in the product luminance curve block 166. The command generation block 168 may include a curve or a set of values operate as an inverse function of the operation of the backlight controller IC 170. That is, the backlight controller IC 170 may be a chip that includes a signal converter (e.g., an analog to digital converter or a digital to analog converter), or the backlight controller IC 170 may be the signal converter itself (e.g., an analog to digital converter or a digital to analog converter). When, the backlight controller IC 170 converts a signal, the output from the backlight controller IC 170 may not always correspond to the desired output. That is, noise or other factors may cause the converted signal to deviate from its intended value.

To remedy this potential error, the command generation block 168 may include a curve or a set of values that takes into account faults generated by the backlight controller IC 170 during signal conversion. That is, the command generation block 168 may receive an indication of the current determined in the product luminance curve block 166 and may be able to provide a determination of a location along the a curve that corresponds to a desired input to cause the desired current (from the product luminance curve block 166) to issue from the backlight controller IC 170. This determination may instead include selection a value from a set of values indicative of a desired input to cause the desired current (from the product luminance curve block 166) to issue from the backlight controller IC 170. The determination may be, for example, a current value that may be fed to the backlight controller IC 170 to generate an accurate current from the backlight controller IC 170 that corresponds to the current determined in the product luminance curve block 166.

Figure 13:
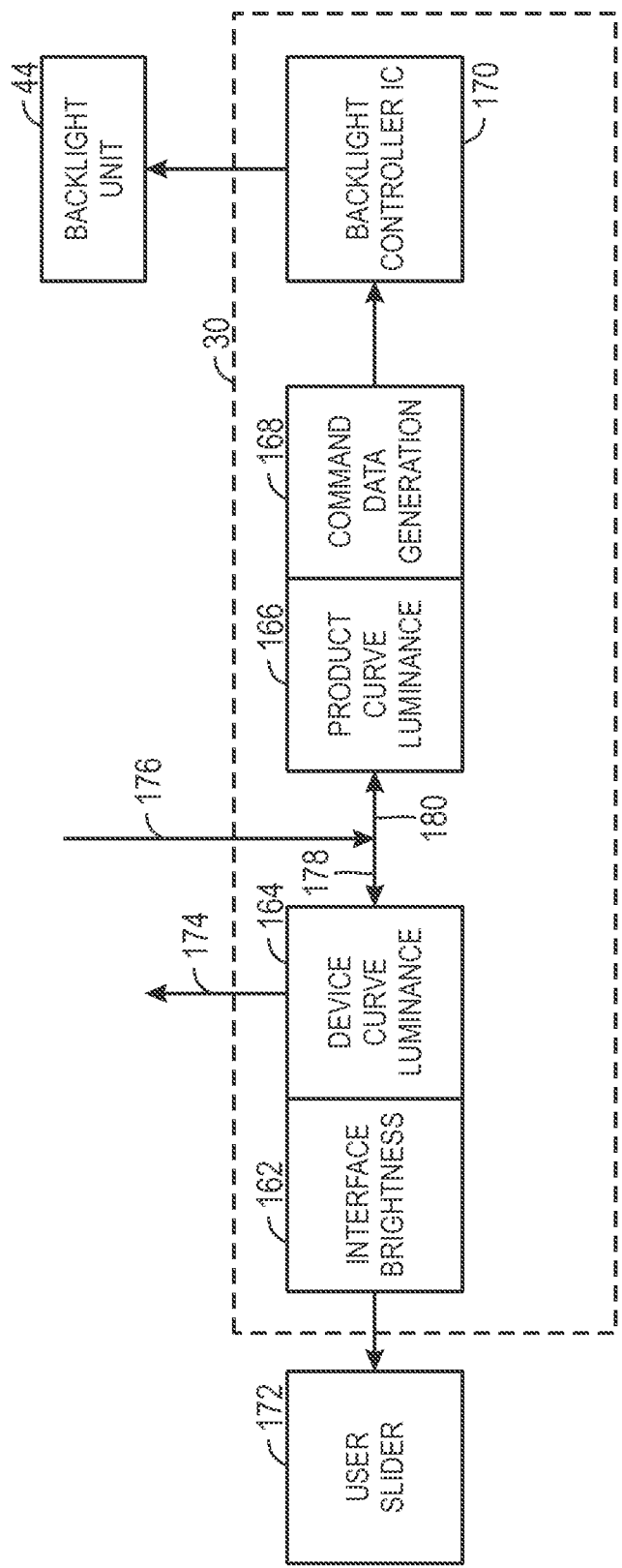
FIG. 13 illustrates a block diagram illustrating the interaction between the display calibration unit of FIG. 1 and the backlight unit of FIG. 4 in accordance with aspects of the present disclosure

FIG. 13 illustrates a second block diagram of the backlight calibration unit 30 interacting with the backlight unit 44. Again, the backlight calibration unit 30, as illustrated, may utilize information from the interface brightness block 162, the device luminance curve block 164, the product luminance curve block 166, and the command generation block 168 to generate information that may be utilized by the backlight controller integrated circuit (IC) 170 to drive the backlight unit 44. As illustrated in FIG. 13, a desired brightness level may not be received from the user slider 172, but rather along path 176 (e.g., from software stored in memory 20 or storage 22 and executed by processor 18). This brightness level may correspond to a desired luminance for the backlight unit 44 and may, in some embodiments, take into account information transmitted from path 174.

The signal from path 176 may include an indication that the backlight is to be dimmed to a certain luminance, for example, in response to a battery threshold level being passed (e.g., a determination to reduce the brightness of the device by a certain percent when the battery life of the device falls below a preset or selected threshold). This indication of a desired luminance may be received along path 178.

The device luminance curve block 164 may determine based on the desired luminance value received a location along the curve 112 corresponding to the desired luminance value (e.g., received from path 178) or may select a value from a set of values indicative of the desired luminance value. This determined luminance value may be provided to the interface brightness block 162.

The interface brightness block 162 may receive an indication of the luminance value determined by the device luminance curve block 164 and may determine a corresponding value or a location on a curve representing preset values that corresponds to the location of an icon 40 of the GUI 38 of the device, for example, sliding a brightness icon 40 along the LCD 34, That is, based on the indication of the luminance value determined by the device luminance curve block 164, a determination may be made as to the location a slider icon 40 should be as part of a GUI. This information may be transmitted to the user slider 172 to allow for updating of the location of the slider icon 40 with respect to the luminance value received along path 178.

Additionally, the signal from path 176 may be transmitted to the product luminance curve block 166 along path 180. As previously noted, the product luminance curve block 166 may be populated with information relating to the average behavior of a product. This information may be determined by, for example, measuring device response characteristics for a set of devices 10 (i.e., 10, 20, 30, 40, 50, or more devices). For example, brightness of the set of devices 10 with respect to a plurality of LCD 34 currents may be measured, averaged, and linearized into the information contained in the product luminance curve block 166. This information may include, for example, 100, 200, 300, 400, 500, 600, or more data points and a curve based on these data points may be extrapolated. In another embodiment, a polynomial related to the data points may be stored in the product luminance curve block 156. In some embodiments, adjustment of the populated with information relating to the average behavior of a product may be aided by information the product luminance curve block 166 is populated with information relating to the average behavior of a product. This information may also be adjusted, for example, utilizing information received along path 162 relating to, for example, adaptive brightness control or predicted degradation of the unit pixels 60 over time (which may tend to alter the validity of the previous information in the product luminance curve block 166) and/or may be adjusted to include adjustments relating to the device 10 in which the product luminance curve block 166 resides (i.e., information from the device luminance curve block 164). That is, information, such as unit pixel 60 degradation and/or ambient light measurements may be made at a certain rate (i.e., hourly, daily, weekly, monthly, etc.), for example, by the ambient light sensor 41, and these measurements may be utilized to update the information in the product luminance curve block 166 so that the information in the product luminance curve block 166 more accurately represent the average behavior of a product.

This product luminance curve block 166 may receive an indication of luminance that was transmitted along path 180. Based on this value (e.g., which may include adjustments for inherent characteristics of the device 10 as previously described in conjunction with FIGS. 10 and 11), the product luminance curve block 166 may determine the relevant current to drive the device by determining a location along the a curve that corresponds to the indication of luminance indicated by the signal from path 180 or the luminance curve block 166 may determine the relevant current to drive the device by selecting a value from a set of values indicative of the indication of luminance indicated by the signal from path 180. That is, the product luminance curve block 166 operates to receive a specific luminance value of the backlight and look-up and output the corresponding current related to that luminance.

The command generation block 168 may receive an indication of the current determined in the product luminance curve block 166. The command generation block 168 may include a curve or a set of values operate as an inverse function of the operation of the backlight controller IC 170. That is, the backlight controller IC 170 may be a chip that includes a signal converter (e.g., an analog to digital converter or a digital to analog converter), or the backlight controller IC 170 may be signal converter itself (e.g., an analog to digital converter or a digital to analog converter). When, the backlight controller IC 170 converts a signal, the output from the backlight controller IC 170 may not always correspond to the desired output. That is, noise or other factors may cause the converted signal to deviate from its intended value.

To remedy this potential error, the command generation block 168 may include a curve or a set of values that takes into account faults generated by the backlight controller IC 170 during signal conversion. That is, the command generation block 168 may receive an indication of the current determined in the product luminance curve block 166 and may be able to provide a determination of a location along the a curve that corresponds to a desired input to cause the desired current (from the product luminance curve block 166) to issue from the backlight controller IC 170. This determination may instead include selection a value from a set of values indicative of a desired input to cause the desired current (from the product luminance curve block 166) to issue from the backlight controller IC 170. The determination may be, for example, a current value that may be fed to the backlight controller IC 170 to generate an accurate current from the backlight controller IC 170 that corresponds to the current determined in the product luminance curve block 166.

In this manner, the command generation block 168 may adjust the values (e.g., current values) transmitted to the backlight controller IC 170 and, thus, allow for more accurate backlight control. It should be noted that the commands issued from the command generation block 168 may include commands related to a duty factor, a spread spectrum, or any backlight power control of the backlight unit 44.

The backlight calibration unit 30 described above allows for handshaking between the blocks 162, 164, 166, and 168 with limited computation and use of memory since, for example, each of the blocks 162, 164, and 166 may transmit information in a common unit, e.g., in terms of luminance Thus, as a device 10 operates, for example, moving from one brightness level to another, the device 10 may utilize dynamically calculated parameters to account for device specific nuances regarding driving the backlight unit 44.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method of manufacturing a display, comprising:
   driving a display at a first current;
   measuring a display characteristic generated by the display while being driven at the first current;
   determining whether the first current is to be adjusted based on a comparison of the measured display characteristic with at least one threshold value; and
   storing an adjusted current value used to adjust the display characteristic only when it is determined that the first current is to be adjusted based upon the comparison.

2. The method of claim 1, wherein measuring the display characteristic comprises measuring a brightness of the display.

3. The method of claim 2, wherein measuring the brightness of the display is performed via an ambient light sensor physically located in a common enclosure with the display.

4. The method of claim 2, wherein measuring the brightness of the display is performed via a light sensor physically separate from the display.

5. The method of claim 1, wherein the comparison of the measured display characteristic with at least one threshold value comprises a comparison of a brightness of the display with a predetermined minimum brightness level for the display.

6. The method of claim 5, comprising generating the adjusted current value when it is determined that the brightness of the display is less than the predetermined minimum brightness level for the display.

7. The method of claim 6, comprising generating the adjusted current value as a lesser of a preset maximum current of the display and a function of the brightness of the display at the first current against the predetermined minimum brightness level for the display.

8. The method of claim 1, wherein the comparison of the measured display characteristic with at least one threshold value comprises a comparison of a brightness of the display with a predetermined maximum brightness level for the display.

9. The method of claim 8, comprising generating the adjusted current value when it is determined that the brightness of the display is greater than the predetermined maximum brightness level for the display.

10. The method of claim 9, comprising generating the adjusted current value as a greater of a preset minimum current of the display and a function of the brightness of the display at the first current against the predetermined maximum brightness level for the display.

11. The method of claim 1, comprising:
    driving a display at a second current;
    measuring a second display characteristic generated by the display while being driven at the second current;
    determining whether the second current is to be adjusted based on a comparison of the second measured display characteristic with at least one second threshold value; and
    storing a second adjusted current value if it is determined that the second current is to be adjusted.

12. An electronic device, comprising:
    a display configured to display an image; and
    a backlight calibration unit comprising:
       a processor configured to receive an indication of a display characteristic generated by the display while being driven at a first current and determine whether the display characteristic is to be adjusted based on a comparison of the indication of the display characteristic with at least one threshold value; and
       a memory, wherein the memory is configured to store an adjusted current value used to adjust the display characteristic only when it is determined by the processor that the display characteristic is to be adjusted based upon the comparison.

13. The electronic device of claim 12, comprising an ambient light sensor configured to generate the indication of the display characteristic as a brightness level of the display.

14. The electronic device of claim 12, wherein the processor is configured to compare the indication of the display characteristic with a predetermined minimum brightness level for the display as the at least one threshold value.

15. The electronic device of claim 14, wherein the processor is configured to generate the adjusted current value as a lesser of a preset maximum current of the display and a function of a brightness of the display at the first current against the predetermined minimum brightness level for the display only when it is determined that the indication of the display characteristic is less than the predetermined minimum brightness level for the display.

16. The electronic device of claim 12, wherein the processor is configured to compare the indication of the display characteristic with a predetermined maximum brightness level for the display as the at least one threshold value.

17. The electronic device of claim 16, wherein the processor is configured to generate the adjusted current value as a greater of a preset maximum current of the display and a function of a brightness of the display at the first current against the predetermined maximum brightness level for the display only when it is determined that the indication of the display characteristic is greater than the predetermined maximum brightness level for the display.

18. The electronic device of claim 12, wherein the processor is configured to receive a second indication of a second display characteristic while being driven at a second current and determine whether the second display characteristic is to be adjusted based on a comparison of the second indication of the second display characteristic with at least one threshold value, wherein the memory is configured to store a second adjusted current value related to the second display characteristic if it is determined by the processor that the second display characteristic is to be adjusted.

19. An electronic device, comprising:
a display configured to display an image; and
a backlight calibration unit comprising:
  a processor configured to receive an indication of the brightness of the display while being driven at a first current and determine whether the first current is to be adjusted based on a comparison of the indication of the brightness of the display with at least one threshold value; and
  a memory, wherein the memory is configured to store an adjusted current used to adjust a display characteristic only when it is determined by the processor that the first current is to be adjusted based upon the comparison.

20. The electronic device of claim 19, comprising an ambient light sensor configured to generate the indication of the brightness of the display.

21. The electronic device of claim 19, wherein the processor is configured to compare the indication of the brightness of the display with a predetermined minimum brightness level for the display as the at least one threshold value.

22. The electronic device of claim 21, wherein the processor is configured to generate the adjusted current value as a lesser of a preset maximum current of the display and a function of the brightness of the display at the first current against the predetermined minimum brightness level for the display only when it is determined that the indication of the brightness of the display is less than the predetermined minimum brightness level for the display.

23. The electronic device of claim 19, wherein the processor is configured to compare the indication of the brightness of the display with a predetermined maximum brightness level for the display as the at least one threshold value.

24. The electronic device of claim 23, wherein the processor is configured to generate the adjusted current value as a greater of a preset maximum current of the display and a function of the brightness of the display at the first current against the predetermined maximum brightness level for the display only when it is determined that the indication of the brightness of the display is greater than the predetermined maximum brightness level for the display.

25. The electronic device of claim 19, wherein the processor is configured to receive a second indication of a second brightness of the display while being driven at a second current and determine whether the second current is to be adjusted based on a comparison of the second indication with at least one threshold value, wherein the memory is configured to store a second adjusted current value if it is determined by the processor that the second current is to be adjusted.

* * * * *